Sept. 15, 1964      E. E. SHELDON      3,149,258

ELECTRON MICROSCOPE WITH AN X-RAY TARGET

Original Filed Sept. 9, 1954

INVENTOR.
EDWARD EMANUEL SHELDON 3,149,258
ELECTRON MICROSCOPE WITH AN X-RAY
TARGET
Edward Emanuel Sheldon, 310 W. 85th St.,
New York, N.Y.
Original application Sept. 9, 1954, Ser. No. 454,981, now Patent No. 2,894,160, dated July 7, 1959. Divided and this application June 3, 1959, Ser. No. 817,886
2 Claims. (Cl. 313—65)

This invention relates to the novel electron microscopes and novel electron diffraction cameras, and has a common subject matter with my U.S. Patent 2,739,243, filed January 8, 1953, and issued March 20, 1956, and is a division of my application Serial No. 454,981, filed September 9, 1954, and which matured into U.S. Patent 2,894,160, granted July 7, 1959.

An objective of this invention is to provide an electron microscope in which the photography of the examined object does not require any more the introduction of the photographic plate into vacuum. This represents a great improvement as it eliminates the need for repeated restoration of the vacuum which is impaired any time the photographic cassette is inserted or removed from the electron microscope.

The invention will be better understood when taken in connection with the accompanying drawings.

Figures 1, 2:
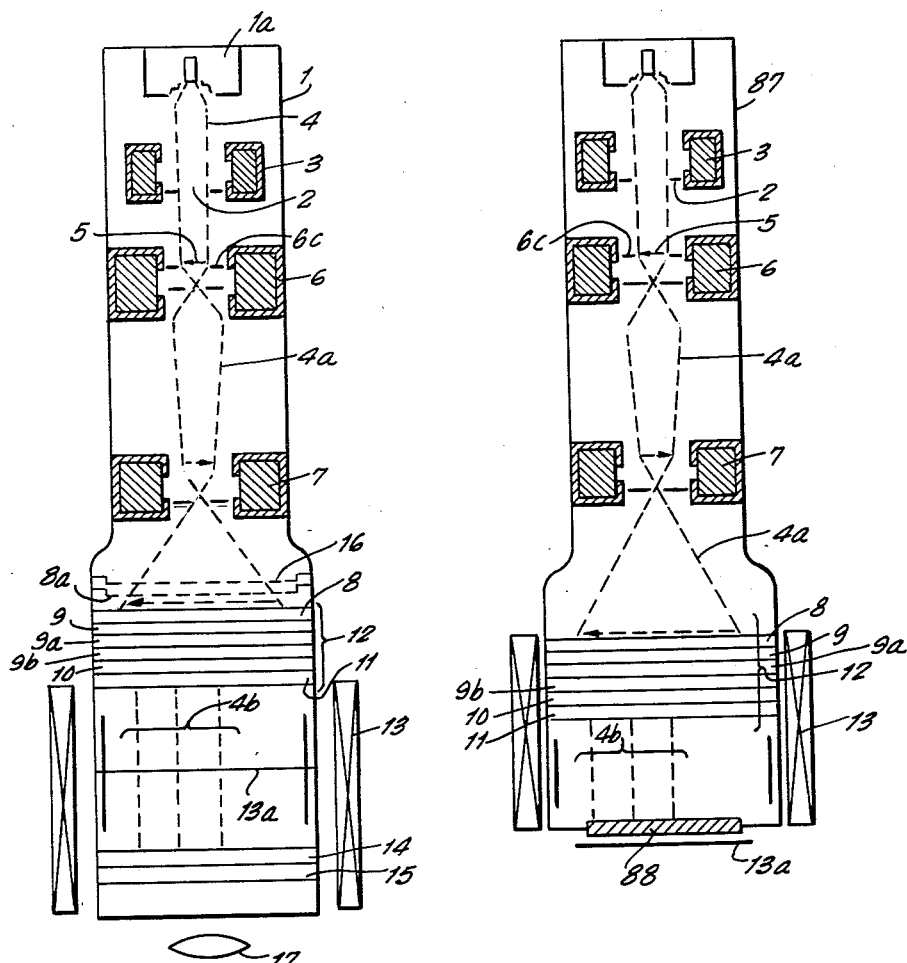
FIG. 1 represents the novel electron microscope.
FIG. 2 represents the novel electron microscope having an X-ray emitting window.

FIG. 1 represents the novel electron microscope 1. The microscope 1 has a source of electrons 1a which may be an electron gun of hot filament type or of cold emission type. The emitted beam of electrons 4 is collimated by the aperture 2 and is focused by the condenser lens 3 on the examined specimen 5. As illustrated in FIG. 1a of U.S. Patent 2,894,160, the specimen may be deposited on a supporting plate 6a, with an opening therein or on a mesh screen such as of silver. This support can be attached to the elongated holder 6b. The holder 6b is inserted into microscope from the side so that the supporting plate 6a may be deposited on the specimen table 6c shown in FIG. 1a, which should be of a non-magnetic type. The table 6c is mounted in the focal plane of the objective. The insertion and removal of the holder does not cause destruction of the vacuum as the holder when it is inserted into the microscope presses against rubber piston provided with a spring. When the holder is removed from the microscope the compressed spring pushes the rubber piston back in the place of the holder and prevents thereby admission of the air into the microscope. The table 6c is provided with the pins 6d which allows to move said table in two directions perpendicular to each other. The knobs outside of the microscope regulate the motion of pins and control thereby the movement of the table. In this way the specimen may be moved and examined over its entire field.

The electron beam 4a transmitted through the specimen is focused by the objective lens 6 on the plane of the projection lens 7. In some cases it is preferable to use an intermediate lens between the objective lens and the projection lens. The projection lens provides the final enlargement of the electron image so that the enlarged image may now cover the whole area of the fluorescent screen. All lenses in this embodiment of the invention may be of magnetic type. The electron image of the examined specimen is, because of its enlargement 10,000 to 50,000 times, very dim. In many examinations the brightness of said enlarged image is so low that the examiner's eye loses its visual acuity for the contrast and detail. At the low level of illumination the eye operates by means of rods instead of cones and as a result the perception of detail and contrast is completely impaired. One of the most important steps in electron microscopic examination is the choice of a proper field for recording. This can be accomplished only if the examiner can see what he is examining. In the present electron microscopes the brightness of image cannot be improved because the use of a stronger electron beam will damage the specimen, as was explained above. The transmitted electron beam 4a which carries the image of the examined object is in this invention projected on the composite screen 12. The composite screen 12 consists of an electron transparent light reflecting or light diffusing layer 8, of a fluorescent layer 9, light transparent separating layer 10 and a photoelectric layer 11. The fluorescent layer 9 must be as thin as it is compatible with its efficiency and it must be of a very fine grain because this layer must be able to resolve fine detail, such as images of 25 lines per millimeter definition. Phosphors such as ZnSCdS, silicates, tungstates or ZnO are suitable for this purpose. The best results for definition are obtained with grainless evaporated phosphors. Also single large crystals of phosphors are suitable because of their grainless structure.

On the side of the fluorescent layer 9 opposite to the electron gun 1a is now deposited a very thin protecting light transparent layer 9a such as of silicon monoxide, silicon dioxide or $ZnF_2$. The protecting layer 9a must be thicker than 0.5 to 1 micron to prevent migration of hot ions of Cs across said layer which would destroy the luminescent layer 9. On the top of layer 9a is deposited an extremely thin layer 9b, such as of the order of 50A. up to ¼ of wave-length of luminescent light, which serves as a selector or filter for the luminescent light from the layer 9. On the top of the layer 9b is now deposited a very thin light transparent layer 10 of conductive material such as of gold, tungsten, silver, silicon, tin oxide or other compounds of tin, cadmium sulfide or other compounds of cadmium or $ZnF_2$. The layer 10 may be omitted in some cases. On the conducting layer 10 next is deposited a photoelectric layer 11 such as of CsOAg, caesium, potassium, lithium or rubidium with antimony, bismuth or arsenic, or of a combination of several aforesaid elements. In some cases when the conducting layer 10 is eliminated the antimony should be evaporated together with palladium or tungsten to provide a conducting property to the photoelectric layer of $Cs_3Sb$ or other antimony containing photoelectric compound. This will not be necessary if the filter layer 9b has conducting properties. It was found that tin oxide and other compounds of tin cannot be used with Cs or Sb. They turned black and lost transparency when exposed to Cs.

The fluorescent layer 9 cannot be made self-supporting when it is as thin as it is necessary for the purpose of this invention. It requires, therefore, a support which must be transparent to electrons, as otherwise prohibitive losses of the image forming electron beam will occur. I solved this problem by using as a support a fine mesh screen 8a. The phosphor layer 9 with a binder such as potassium silicate is deposited on said supporting mesh in such a manner as to occlude the openings of the mesh. Before the deposition of the fluorescent layer 9 it is preferable to deposit first on said mesh screen 8a a very thin layer 8 of aluminum or of one of the noble metals. This conducting layer may be of the thickness such as ½ to 1 micron. A layer of a metal of this thickness may act as a base for the luminescent layer 9 and at the same time will be essentially transparent to electrons of velocity used in electron microscopes.

Another solution of the problem of supporting the composite screen 12, I found is the use of a plastic material such as one of polyesters which are heat resistant.

Especially Mylar produced by Du Pont Company, of Wilmington, Delaware, was found to be very suitable for this purpose. First, I made a solution of Mylar in a suitable solvent. Next, I add the suspension of luminescent material to said solution of Mylar. After subjecting said composition to a thorough mixing, I evaporate the mixture. As a result, a light transparent solid material is formed which represents a combination of Mylar and of luminescent material embedded in each other. This new luminescent material can be made in sheets of any desired thinness. Such sheets I found to be self-supporting and to have enough tensile strength when only 2 to 5 microns thin, even if the size of such sheet was 10 inches in diameter.

Another modification of my invention is shown in FIG. 2. The electron microscope 87 may be of magnetic type as shown in FIG. 1, or of electro-static type. The novel microscope 87 is designed to eliminate the need for inserting and removing photographic plates into the vacuum chamber of the microscope. The present procedures necessitates a continuous reestablishing of the vacuum in the microscope. In order to eliminate these costly and time consuming pumping procedures the novel microscope 87 does not require any more the insertion of photographic plates into the inside of the microscope as they now can be applied outside of the microscope. The microscope 87 is provided with an X-ray emissive target in shape of a thin metallic window 88 which under irradiation by the electron beam 4a or by the intensified electron beam 4b converts the electron image into an X-ray image. The X-ray image will be a replica of the original electron image as represented by the beam 4a or 4b. The photographic plate may be now brought close to the external surface of the X-ray window 88 and will record the X-ray image without any loss of definition. In this way the photographing of the electron image is now accomplished without disturbing the vacuum of the electron microscope. The window 88 should be very thin in order to preserve the definition of the electron image. It should be however strong enough to be able to withstand the atmospheric pressure. Furthermore it must have a high melting point in order not to be damaged by the electron beam. The materials such as tungsten or tantalum were found to be the best suitable. In some cases they may be deposited on a support of beryllium. It is to be understood however that this invention is not limited to any particular material. The X-ray window 88 must be also free of mechanical vibrations. I found that the main disadvantage of this novel microscope was its poor sensitivity due to the fact that the efficiency of conversion of electrons into X-rays is very low. However by the use of the intensifying screen 12 described above this difficulty was successfully overcome. In some cases it is preferable to make the X-ray window of convex shape, with the convex surface facing the electron gun, as it will then permit the window to be much thinner without the danger of its breaking down under the atmospheric pressure. As the electron beam in the electron microscope has a great depth of field the X-ray beam will remain focused well in spite of the curvature of the window. In some cases the X-ray target may be disposed within the microscope instead of being a part of the tube wall.

This electron beam is of non-scanning type which means it is stationary in relation to the examined specimen. It should be understood that the composite screen 12 in all embodiments of my invention may be retracted from the path of electrons so that the electron beam may have a direct access to the fluorescent screen 15 or to the photographic plate or to X-ray window 88.

It should be understood also that this invention applies not only to electron microscope but also to a microscope using other atomic particles such as protons and also to a microscope using ions such as lithium ions. Furthermore this invention applies to images produced by transmitted electrons and to images produced by transmitted electrons and to images produced by reflected or scattered electrons as well.

It is to be understood that in the specification and in the appended claims the definition "a beam stationary in relation to the examined specimen represents a non-scanning beam of particles impinging on a specimen."

While the embodiments of the present invention as herein disclosed, constitute a preferred form, it is to be understood that other forms might be adopted, all coming within the scope of the claims which follow.

What is claimed is as follows:

1. A vacuum tube comprising in combination a source of charged particles, means for producing a non-scanning beam of said particles, means for supporting a specimen mounted inside of said tube, means for irradiating said specimen with said particles to produce a particles image of said specimen and a window in the wall of said tube for receiving said particles, said window comprising a layer of metallic material absorbing said particles and converting said particles into X-rays.

2. A vacuum tube comprising in combination a source of charged particles, means for producing a non-scanning beam of said particles, means for supporting a specimen mounted inside of said tube, means for irradiating said specimen with said particles to produce a particles image of said specimen, and a window in the wall of said tube for receiving said particles, said window comprising a layer of material transmitting said particles and a layer of a metallic material absorbing said particles and converting said particles into X-rays.

References Cited in the file of this patent

UNITED STATES PATENTS

| | | |
|---|---|---|
| 2,160,081 | Niclassen | May 30, 1939 |
| 2,266,717 | Von Borries et al. | Dec. 16, 1941 |
| 2,372,170 | Baker | Mar. 27, 1945 |
| 2,418,029 | Hillier | Mar. 25, 1947 |
| 2,561,988 | Longini | July 24, 1951 |
| 2,652,515 | McGee | Sept. 15, 1953 |
| 2,747,131 | Sheldon | May 22, 1956 |
| 2,877,353 | Newberry | Mar. 10, 1959 |
| 2,894,160 | Sheldon | July 7, 1959 |